United States Patent [19]

Fulmer et al.

[11] 4,367,259

[45] Jan. 4, 1983

[54] SOUND DEADENING MATERIAL

[75] Inventors: Glenn E. Fulmer, Clarksville; Louis L. Wood, Rockville, both of Md.

[73] Assignee: W. R. Grace & Co., New York, N.Y.

[21] Appl. No.: 287,353

[22] Filed: Jul. 27, 1981

[51] Int. Cl.$^3$ .................. C08G 18/48; C08L 6/00; B32B 5/16

[52] U.S. Cl. .................. 428/240; 428/242; 428/283; 428/339; 521/123; 521/137; 521/905; 524/423; 524/425; 524/439; 524/916; 524/871; 525/455; 528/55; 528/57; 528/904; 181/293

[58] Field of Search .................. 521/905, 137, 123; 260/29.2 TN, 37 N; 528/904, 57, 55; 181/33 G; 524/423, 425, 916, 439, 871; 525/455; 428/240, 242, 283, 339

[56] References Cited

U.S. PATENT DOCUMENTS

| | | | |
|---|---|---|---|
| 3,652,360 | 3/1972 | Hartman et al. | 181/199 |
| 3,897,372 | 7/1975 | Kehr et al. | 260/2.5 AJ |
| 4,010,818 | 3/1977 | Westley | 181/33 |
| 4,061,618 | 12/1977 | Stanley et al. | 260/29.2 TN |
| 4,066,578 | 1/1978 | Murch et al. | 260/2.5 AG |
| 4,110,510 | 8/1978 | Oliveira | 428/285 |
| 4,158,087 | 6/1979 | Wood | 521/905 |
| 4,191,798 | 3/1980 | Schumacher et al. | 428/95 |
| 4,241,537 | 12/1980 | Wood | 47/77 |
| 4,246,146 | 1/1981 | Wood et al. | 260/9 |

*Primary Examiner*—H. S. Cockeram
*Attorney, Agent, or Firm*—Edward J. Cabic; Richard P. Plunkett; William W. McDowell, Jr.

[57] ABSTRACT

A sound deadening material is obtained with a very high loading of sound damping materials such as barium sulfate, calcium carbonate or metal powders. These materials are mixed with water and are bound together by adding a water-miscible isocyanate-terminated prepolymer which reacts with the water to form a crosslinked binder.

18 Claims, No Drawings

SOUND DEADENING MATERIAL

BACKGROUND OF THE INVENTION

1. Field of the Invention

This invention relates to a sound absorber polymer product containing large amounts of a sound absorbing material bound together by a polymer.

2. Description of the Prior Art

Sound barrier materials have been made by incorporating sound deadening particles into polymer binders. However, the loading levels have been relatively low.

In U.S. Pat. No. 4,110,510 to Oliveira, the sound barrier material comprises a polyvinyl chloride impregnated mesh sheet having a coating of a chlorinated polyethylene containing barium sulfate. This coated sheet is laminated to two sides of an intermediate foam layer. The maximum loading of the barium sulfate in the chlorinated polyethylene binder is a weight ratio of 2:1 so that there are only two parts of barium sulfate to one part of resin binder.

In U.S. Pat. No. 4,010,818 to Westley, the flexible noise barrier is in the form of a mass building coat adhered to a non-woven substrate. The mass building coat consists of neoprene and it has dispersed therein particles of iron sulfide, iron oxide, barium sulfate or barium oxide. In the recipe given the weight of barium sulfate in the neoprene is only equal to the weight of the neoprene. The preferred concentration of particles is 45–55% with the maximum contemplated, based on the total weight, being 70%.

In U.S. Pat. No. 4,191,798 to Schumacher et al, the sound-deadening sheeting is a highly filled thermoplastic composition. It contains 5–50% by weight of an ethylene interpolymer, about 2–15% by weight of processing oil and about 50–90% by weight of filler which can be either calcium carbonate or barium sulfate. It requires the special combination of resins such as vinyl acetate and an ethylene copolymer in addition to the processing oil.

As to hydrogel binders, U.S. Pat. No. 4,246,146 to Wood et al discloses a generic class of elastomeric polyurethane hydrogel compositions which includes the preferred materials of this invention. However, the compositions of the Wood et al patent are mixed with large quantities of fire retardant materials to form a coating which provides a barrier for fire retardant protection. U.S. Pat. 4,241,537 to Wood discloses a plant growth media using polyurethane hydrogel. There is no suggestion in either of these patents of making independent structures for sound deadening purposes.

3. Objects of the Invention

It is an object of this invention to produce a sound deadening composition that can be formed into shapes.

It is a further object to produce a low cost sound deadening composition containing a large amount of an inexpensive (on a per pound basis) sound deadening material and a relatively small amount of the more expensive polymer binder.

It is a further object of this invention to produce a sound deadening composition containing a large quantity of sound absorber particles incorporated in a small amount of a polymer binder, which composition can be formed into desired shapes.

It is a further object of this invention to provide a method to incorporate a large quantity of particles of a sound deadening material into a polymer binder for fabricating into desired shapes.

It is a further object to produce a flexible sound deadening composition having a weight ratio of barium sulfate to polymer binder of greater than 10:1.

These and further objects will become apparent as the description of the invention proceeds.

SUMMARY OF THE INVENTION

A mass of sound deadening material can be formed into a mass damping part by mixing together large amounts of the sound absorber such as barium sulfate or calcium carbonate in an aqueous suspension with a unique hydrophilic prepolymer. By using a water-miscible isocyanate-terminated prepolymer as the binder, large amounts of the sound absorber particles already in a water suspension can be mixed with the prepolymer at room temperature to form a reactive mixture which has sufficient time to permit molding the mass to the desired shape before the prepolymer cures to form a polymer binder of a polyurethane hydrogel which holds the large mass of particles together. Particle loadings of at least 10 times the weight of binder are easily achieved and loadings at levels of at least 20 times are obtainable. The material can be molded into flexible sheets and applied to a fiberous layer for increased strength. Additional latex can be added when further strength is desired.

The reactive end groups of the prepolymer can be made with either the conventional aromatic isocyanate terminal groups or with aliphatic isocyanate terminal groups which lower the reactivity of the prepolymer to permit longer time for shaping the final form of the article. The aromatic groups result in a prepolymer that can react with water and cure in about 30 seconds.

The main internal portion of the water-miscible polyisocyanate prepolymer can be made from a polyether polyol which contains enough oxyethylene units to make the prepolymer water-miscible. In order to permit cross-linking of the final polymer coating, one embodiment employs a polyol which has more than two hydroxyl groups. Each of these hydroxyl groups can be capped with conventional diisocyanates such as toluene diisocyanate to yield the water-miscible polyisocyanate prepolymer. In another embodiment, the cross-linked final polymer structure can be obtained by selecting a diol, rather than a polyol, as the basic unit of the prepolymer with the isocyanate capping being done with a polyisocyanate having greater than two NCO groups per molecule.

The NCO groups on the prepolymer produce carbon dioxide when contacted with water. To insure, in the preferred procedure, that a gel is formed rather than a conventional polyurethane foam, the effective amount of NCO groups per prepolymer molecule must be reduced. This is done by utilizing relatively large polyol molecules between the terminal NCO groups. When the hydroxyl groups of a large polyol molecule are capped with the diisocyanate groups, for example, the number of average molecular weight of the prepolymer obtained is about 2,000 or above. The prepolymer is employed in the range of 1 to 100 parts of water and preferably in the range of about 1–20 parts per 100 parts of water. Although foaming is not a particular problem in making this product, the preferred procedure is not to have much foaming. Thus, if a relatively large ratio of prepolymer to water in the above range is being used, it may be advisable to employ a higher molecular weight prepolymer to lower the resultant number of NCO groups so as to avoid any production of foam in the preferred embodiments. The water phase also contains large quantities of the sound barrier material. When smaller amounts of prepolymer are employed, there will not be enough resin to hold together the large amounts of additives. Larger amounts of prepolymer can be employed with the added benefit of greater strength.

DESCRIPTION OF THE PREFERRED EMBODIMENTS

The preferred prepolymer used in making the binder has a relatively large molecular weight with a relatively low amount of NCO per unit weight. Foams, on the other hand, have a much larger concentration of NCO groups per weight of the prepolymer. For example, the foams described in the Murch et al U.S. Pat. No. 4,066,578 have about two equivalents of NCO per 1000 grams of the prepolymer where one equivalent of NCO weighs 42 grams. This concentration can also be expressed as two milliequivalents of NCO per gram of prepolymer and written as 2 meq. NCO/g. The present prepolymers have considerably less NCO groups on the order of about 1.0 meq. NCO/g or less. Thus there is a great deal more of the hydrophilic polymer between each terminal NCO group which by itself is hydrophobic. As a result the overall prepolymer is hydrophilic and dissolves completely in water.

One technique for making the low NCO concentration prepolymer is to chain extend a polyol with polyoxyalkylene units. Using the triol glycerol with the units of ethylene oxide and/or propylene oxide, for example, the following prepolymer forming polyol can be obtained

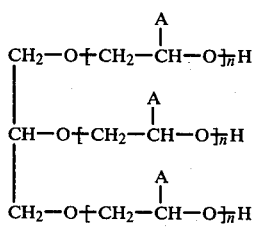

with the value of n being about 10 to 50 and where A can be H or CH$_3$. Whan A is H, the bracketed unit is an ethylene oxide (EO) unit and when A is CH$_3$, the unit propylene oxide (PO). The amount of propylene oxide (PO) employed must be limited since the prepolymer will not have the necessary hydrophilicity if only PO is used. In the case where just PO and EO are used, the amount of PO to the total PO+EO should be less than about 50 percent so the prepolymer will dissolve in water. A further reason for this range is that when the PO content increases above 50 percent, the fire retardant ability of the resulting polymer diminishes. The property may be helpful in some applications.

This particular trifunctional polyol is then reacted with a diisocyanate to provide the urethane linkage and the terminal isocyanate groups as follows

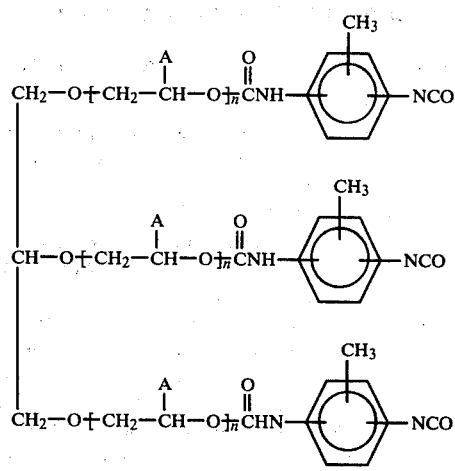

The selection of the polyoxyalkylene component depends on the conditions employed when the isocyanate capped prepolymer is subsequently dissolved in water to form the gel. A polyoxyalkylene made of just ethylene oxide units will be hydrophilic and dissolve in water, but it is a solid at room temperature. This can cause a problem during use. While waiting for the last of the solid prepolymer to slowly dissolve in water, the part that has already dissolved may prematurely begin to form a gel, as will be explained later, so that a homogeneous gel is not obtained. To avoid this problem, it is advantageous to have the prepolymer in a liquid form so it can readily dissolve without heating, which increases the gelation rate, and mix with the water to form a gel with the high loading of sound deadening particles. A prepolymer which is a liquid at room temperature can be obtained by incorporating various amounts of a relatively hydrophobic comonomer into the ethylene oxide based polymerization product. Comonomers such as propylene oxide (PO) described in the example above or butylene oxide (BO) may be copolymerized as a random copolymer, a block copolymer, or both, such that the resulting copolymer remains hydrophilic. Random copolymerization is especially preferred to insure obtaining a liquid prepolymer having a low viscosity.

The addition of these comonomers also provides other desirable features for certain applications, namely improved low temperature flexibility, resilliency and the like. As discussed earlier, up to about 50 mole percent of a relatively hydrophobic comonomer such as propylene oxide may be copolymerized with the ethylene oxide monomer and still yield hydrophilic cross-linked network binders when those products are used as polyol intermediates in practicing the present invention. Preferred prepolymers have only up to about 30 mole percent of the relatively hydrophobic comonomer. Thus, throughout this text the term "polyoxyethylene polyol" is intended to include not only a homopolymer of ethylene oxide, but also hydrophilic copolymers of ethylene oxide such as those described above wherein all of the polyol derivatives have a hydroxyl functionality of about two or greater. The ethylene oxide content is generally greater than about 50 mole percent so that the resulting prepolymer will be miscible with water.

However, as indicated in the Asao et al U.S. Pat. No. 3,719,050 which is referred to in the Wood et al U.S. Pat. No. 4,241,537, larger amounts of alkylene oxides other than ethylene oxide might be employed to obtain a workable system involving an emulsion rather than a true solution.

The prepolymers do not have to be liquid. If the binder forming operation is carried out at an elevated temperature, then the prepolymer can be melted to the liquid state at that higher temperature. This liquid melt can then readily mix with the water to form the homogeneous gel. In addition, if the capping isocyanate is selected as one having a relatively low reactivity, then it may be acceptable to use a solid prepolymer and to wait for the solid to dissolve at room temperature because the gel forming reaction will not yet have begun.

Prepolymers can be made by reacting EO, PO or BO with polyols such as glycerol,
1,2,6-hexanetriol,
1,1,1,-trimethylolpropane,
3-(2-hydroxyethoxy)-1,2-propanediol,
3-(2-hydroxypropoxy)-1,2-propanediol,
2,4-dimethyl-2-(2-hydroxyethoxy)-methylpentanediol-1,5,
1,1,1-tris[(2-hydroxyethoxy)methyl]ethane,
1,1,1,-tris-[(2-hydroxypropoxy)methyl]propane,
triethanolamine, triisopropanolamine, pyrogallol and phloroglucinol.

One example of a suitable chain-extended polyol is the polyether triol XD 1421 which was made by the Dow Chemical Company. It had a molecular weight of around 4900. It was composed of a ratio of three oxyethylene units randomly copolymerized per one unit of oxypropylene, and it had a hydroxy content of 0.61 meq. OH/g. Another example of a material which is commercially available is Pluracol® V-7 made by BASF Wyandotte which is a high molecular weight liquid polyoxyalkylene polyol.

The chain extended polyol can then be capped with a polyisocyanate to form the prepolymer. Suitable polyisocyanates useful in preparing this type of prepolymer include toluene-2,4-diisocyanate, toluene-2,6-diisocyanate, commercial mixtures of toluene-2,4- and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate,
3,3'-diphenyl-4,4'-biphenylene diisocyanate,
4,4'-biphenylene diisocyanate,
3,3'-dichloro-4,4'-biphenylene diisocyanate,
1,6-hexamethylene diisocyanate, 1,4-tetramethylene diisocyanate, 1,10-decamethylene diisocyanate,
1,5-naphthalenediisocyanate, cumene-2,4-diisocyanate,
4-methoxy-1,3-phenylenediisocyanate,
4-chloro-1,3-phenylenediisocyanate,
4-bromo-1,3-phenlenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether, benzidinediisocyanate,
4,6-dimethyl-1,3-phenylenediisocyanate,
9,10-anthracenediisocyanate, 4,4'-diisocyanatodibenzyl,
3,3'-dimethyl-4,4'-diisocyanatodiphenylmethane,
2,6-dimethyl-4,4-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl, 4,4'-methylene bis(diphenylisocyanate), 4,4'-methylene bis(dicyclohexylisocyanate), isophorone diisocyanate, PAPI (a polyaryl polyisocyanate commercial product sold by the Upjohn Company as defined in U.S. Pat. No. 2,683,730),
1,4-anthracenediisocyanate, 2,5-fluorenediisocyanate, 1,8-naphthalenediisocyanate and 2,6-diisocyanatobenzfuran.

Also suitable are aliphatic polyisocyanates such as the triisocyanate Desmodur N-100 sold by Mobay which is a biuret adduct of hexamethylenediisocyanate; the diisocyanate Hylene W sold by du Pont, which is 4,4'-dicyclohexylmethane diisocyanate; the diisocyanate IPDI or Isophorone Diisocyanate sold by Thorson Chemical Corp., which is 3-isocyanatomethyl-3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate.

Another technique to produce the prepolymer is to use a polyfunctional isocyanate having a functionality greater than 2 in combination with a chain extended diol.

Suitable starting diols for chain extension useful in this method for preparing prepolymers include ehtylene glycol, propylene glycol, trimethylene glycol,
1,2-butylene glycol, 1,3-butanediol, 1,4-butanediol,
1,5-pentanediol, 1,2-hexylene glycol, 1,10-decanediol,
1,2-cyclohexanediol, 2-butene-1,4-diol,
3-cyclohexene-1,1-dimethanol,
4- methyl-3-cyclohexene-1,1-dimethanol,
3methylene-1,5- pentanediol, diethylene glycol,
resorcinol, hydroquinone, 4,6-di-tertiarybutyl catechol, and catechol.

Suitable polyisocyanates useful in this technique include PAPI (a polyaryl polyisocyanate commercial product sold by the Upjohn Company as defined in U.S. Pat. No. 2,683,730), 2,4,6-toulene-triisocyanate and 4,4'4''-triphenylmethane triisocyanate.

Other techniques to prepare the hydrophilic capped polyoxyethylene polyol reaction product having an average isocyanate functionality greater than two are disclosed in the Wood et al U.S. Pat. No. 4,137,200, incorporated herein by reference.

As discussed above, particularly useful gels may be prepared by first capping a polyoxyethylene polyol with a polyisocyanate such that the capped product has a reaction functionality greater than 2. Thereafter, the resin is reacted by dissolving it in water such that a crosslinked gel results.

It is also possible to use an isocyanate capped polyoxyethylene polyol having a functionality approximating 2, in which case a polyfunctional reactive member such as one having three or up to about eight reactive amine, hydroxy, thio or carboxylate sites per average molecule is included to form a three dimensional crosslinked product. The reactive member preferably is one that is reactive enough to compete with the reaction of the water with the isocyanate groups. Useful polyfunctional reactive members are amines which include materials such as diethylenetriamine, triethylenetetramine, tetraethylenepentamine, polyethyleneimine, tolylene-2,4,6-triamine, ethylenediamine, trimethylenediamine, tetramethylenediamine, pentamethylenediamine,hexamethylenediamine, aminoethanol, diethanolamine,hydrazine, triethanolamine, 4,4',-methylenebis (p-chloraniline), and the like.

To produce the binder structure the prepolymer is dissolved in water which also contains the sound barrier particulate materials. Some of the terminal NCO groups react with water to form a carbamate compound which is unstable at room temperature and which breaks down to form an amine. The amine in turn reacts with another chain terminated NCO group to form a urea linkage to join the two chains. The reaction can be illustrated as follows:

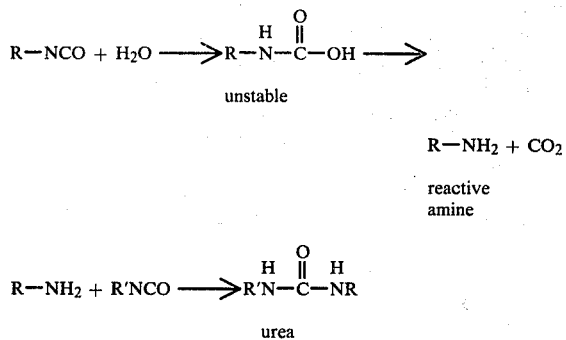

Various types of sound barrier materials can be incorporated into the binder. Most of the materials are first suspended or dissolved in the aqueous phase to form the slurry or solution and then the prepolymer is mixed with the slurry. The amount of materials to be added to the water can vary from about 10 parts of material per 100 parts of water up to about 300 parts of material per 100 parts of water. If concentrations are employed below the lower amount, there may not be enough sound barrier material present in the resulting binder. On the other hand, if more material is added to the water than the upper specified amount, then a very viscous paste will form which will not mix well with the prepolymer. This discussion on the amount of sound deadening additives is based on materials having a density such as a specific gravity of around 4.5, as possessed by barium sulfate. Of course, if much heavier particles are employed, such as lead, having a specific gravity of 11.3, then larger amounts by weight could be added to the aqueous slurry before a limiting thick paste is obtained. In some instances a part of the sound absorbing material can initially be mixed with the prepolymer instead of being added to the aqueous slurry or solution, but this is not the preferred procedure.

The sound deadening fillers can be any of the conventionally empolyed materials such as iron sulfide, iron oxide, barium sulfate, calcium carbonate, bauxite, gypsum, lead and other dense powders such as metal powders. Particularly preferred materials are barium sulfate, calcium carbonate, and metal powders.

In addition, reinforcing agents can also be added to the mixture to improve the strength of the resulting composition. Many types of fibers can be used for this purpose, such as wood, carbon, glass, polyolefin, polyester, polyamide, cellulosic and polyvinyl alcohol fibers; mineral wool; metal fibers; etc.

The sound deadening composition can also be applied to a layer of woven or nonwoven fibers to improve the resulting strength. Typical fibers include polyester, cotton, steel, glass and other conventional reinforcing materials.

In making a sound deadening product there are other factors to be considered than just being able to obtain a large amount of sound deadening material in a relatively small amount of polymer binder. The sound deadening product must also have the desired strength properties, density, modulus and shrinkage resistance.

The tensile strength values obtained for this hydrogel binder system appear to depend on the amount of hydrogel prepolymer used. Under some conditions even a small amount of 5 grams of prepolymer can give a respectable strength when as much as 300 grams of the filler are employed. The tensile strength is also related to the amount of filler employed. As with any filler containing polymer system, the more filler that is used the lower will be the tensile strength.

There is also a relationship between the modulus which is the measure of the stiffness as a function of the amount of the filler employed. Lower modulus values are preferred as they permit the film or sheet to be flexible and to be able to easily fit around an object to be quieted. If too little polymer binder is present for a given amount of filler then the sheet becomes too stiff. Flexibility is desired since it also aids in the ability of the material to absorb more sound.

Most of the materials made in the following examples have a rubbery to leathery feel which indicates the good flexibility that is obtained.

One would expect the dry density in pounds per cubic foot to be nominally a function of the amount of filler employed. Because there is only a small amount of resin present, one would expect the density relationship to be directly proportional to the amount of filler added. The fact that the relationship is not a constant value based on the amount of filler present suggests that there is air entrapped in the samples. It is hypothesized that when more of the filler is used, the water and filler slurry becomes more viscous and thus traps more air in the mixture. Air may also be trapped when the hydrogel prepolymer is mixed in the final mixing.

The shrinkage of the resulting product is a function of the amount of the filler used. If there were no filler added a sample made of the resin binder would shrink to a much higher degree than with the presence of the filler.

The failure strain for the sheets containing $BaSO_4$ as the sound dampener appears to be dependent primarily on the amount of the prepolymer that is used in the formulation. As the relative amount of the polymer decreases, the percent strain at failure also decreases.

The sound damping composition disclosed herein can have the relative amounts of filler and binder varied over a fairly broad range depending on the properties desired. By using the unique water-miscible prepolymer it is possible to incorporate very large amounts of the filler into the composition. This lowers the cost of the sound deadening unit and it lowers the amount of shrinkage of the product when it dries. Additional binder can be added when the product is desired, to be stronger and more rubbery and when it is desired to provide ease of processing and to lower the energy requirements.

A latex emulsion can also be added to the formulation to increase the tensile strength. Latex emulsions such as Versaflex® 1 and Everflex® 81L manufactured by W. R. Grace& Co. can be added in amounts of up to about 20 times the amount of prepolymer binder. Good results have been achieved with latex emulsions being employed in amounts up to 10 times the weight of the binder.

Having described the basic aspects of our invention, the following examples are given to illustrate specific embodiments thereof

PREPARATION EXAMPLE 1

Twelve thousand two hundred grams of the polyether triol XD1421 made by Dow Chemical Company and composed of a ratio of three oxyethylene units randomly copolymerized per one oxypropylene to a molecular weight of around 4900 and having 0.61 meq. OH/g. was dried by vacuum stripping to a moisture content of 0.038% and the pH was adjusted with benzoyl chloride to the point where a 5% solution of the triol had a pH of 4.25. It was reacted at 57° C. for 41 hours with 1,452.8 g. of Type II toluene diisocyanate produced by Olin Chemical Co. This commercial grade of toluene diisocyanate is an 80/20 mixture made of 80 parts of 2,4-toluene diisocyanate and 20 parts of 2,6-toluene diisocyanate. The reaction product is a pale yellow liquid of 10,000 to 13,000 cps at 25° C. and it has 1.00 meq. NCO/g.

PREPARATION EXAMPLE 2

Sixteen thousand eighty four and five tenths grams of the polyester triol XD1421 made by Dow Chemical Company and composed of a ratio of three oxyethylene units randomly copolymerized per one oxypropylene to a molecular weight of around 4900 and having 0.061 meq. OH/g. was dried by vacuum stripping to a low moisture content of less 0.1% and the pH was adjusted with benzoyl chloride to the point where a 5% solution of the triol had a pH of 4.24. It as reacted at 140° F. for 8 hours with 1,819.5 g. of Type II toluene diisocyanate produced by Olin Chemical Co. This commercial grade of toluene diisocyanate is an 80/20 mixture made of 80 parts of 2,4-toluene diisocyanate and 20 parts of 2,6-toluene diisocyanate. The reaction product is a pale yellow liquid of about 11,250 cps at 25° C. and it has 0.55 meq. NCO/g.

EXAMPLES 1–7

These examples illustrate the properties of sheets obtained when increasing amounts of the filler barium sulfate, $BaSO_4$, are mixed with different amounts of the hydrogel binder.

An aqueous mixture was formed by adding barium sulfate in the amounts listed in Table 1A below to 50 grams of water and stirring the mixture. The hydrogel prepolymer of Preparatory Example 1 was added in the amount listed in Table 1A and the mixture was stirred for 10 seconds. The table expresses the amount of the 2 ingredients in the resulting product in two ways. One is to express the amount of binder as the weight % of binder which is the fraction of binder to the total of binder and $BaSO_4$. The second is to express the amount of $BaSO_4$ on the basis of 100 parts of the resin binder which is abbreviated phr. The mold mixture was next poured into a 6 inch×6 inch picture frame having a thickness of 0.091 inch. A sheet of polyethylene was placed under the frame and after the material was poured into the frame, a second sheet of polyethylene was placed on top. The material was uniformly spread out by using an 18 pound rolling pin.

TABLE 1A

| Example | Polymer g. | BaSO4 g. | wt. % Polymer | BaSO4 phr |
|---|---|---|---|---|
| 1 | 5 | 150 | 3.25 | 3000 |
| 2 | 5 | 200 | 2.44 | 4000 |
| 3 | 5 | 300 | 1.64 | 6000 |
| 4 | 10 | 150 | 6.25 | 1500 |
| 5 | 10 | 200 | 4.80 | 2000 |
| 6 | 10 | 300 | 3.22 | 3000 |
| 7 | 20 | 300 | 6.25 | 1500 |

The properties of the resulting product are set forth in Table 1B. Shrinkage occured upon drying the material in the amount set forth in Table 1B. This percentage shrinking was determined by measuring the final area as compared to the area of the initial mold.

The dry density was determined by weighing the sample and dividing the weight by the volume of the sample.

The stress and strain values for failure were obtained from the strss-strain curve and the modulus was calculated from the initial slope of the curve. This modulus is a measure of the flexibility of the sample.

TABLE 1B

| Example | Dry Density lb/ft³ | % Shrinkage on Drying | Thickness inch | Modulus | F Stress psi | F Strain % |
|---|---|---|---|---|---|---|
| 1 | 136 | 8.5 | .0972 | 775 | 14 | 271 |
| 2 | 160 | 5.9 | .0954 | 950 | 13 | 97 |
| 3 | 304 | 2.3 | .1133 | 2142 | 18 | 30 |
| 4 | 152 | 13.0 | .0969 | 4946 | 57 | 255 |
| 5 | 154 | 8.7 | .0989 | 3293 | 56 | 238 |
| 6 | 146 | 3.4 | .1159 | 4671 | 44 | 116 |
| 7 | 125 | 5.2 | .1335 | 2777 | 51 | 236 |

By increasing the amount of the barium sulfate for a fixed amount of polymer there is generally an increase in the modulus value indicating an increase in stiffness. There is also a decrease in the strain value showing the lesser amount of flexibility.

These examples show that a relatively small amount of this unique polymer is able to bind or encapsulate a large amount of dense filler which gives a leathery to rubbery feel which is a key property that a mass damping material possesses.

EXAMPLES 8–11

These examples illustrate the addition of barium sulfate to the hydrogel prepolymer with the addition of a latex material which constitutes further advantageous properties such as increased tensile strength to the resulting product.

In these examples the amount of barium sulfate was maintained the same at 200 grams and the amount of the hydrogel prepolymer of Preparatory Example 1 used and the amount was varied as set forth in Table 2A below. Two different latexes were added. The latex identified as "V" in the table was Versaflex® 1 which is an acrylic terpolymer made by W. R. Grace & Co. This material contains 54–56% solids. The other latex was the product Everflex® 81L which is a polyvinyl acetate copolymer made by W. R. Grace & Co. and which contains 49% solids. The procedure involved adding barium sulfate to the aqueous latex and mixing the two together. After they were mixed, the hydrogel prepolymer was added and mixed for an additional 10 seconds. Again, the materials were poured into a square mold having a dimension of 6 inches ×6 with a height of 0.091 inch. The same rolling procedure was used as in Examples 1–7 to obtain sheets having the properties set forth in Table 2B.

TABLE 2A

| Example | Polymer g. | Latex g. | BaSO4 g. | BaSO4 phr* |
|---|---|---|---|---|
| 8 | 5 | V-50 | 200 | 4,000 |
| 9 | 10 | V-50 | 200 | 2,000 |
| 10 | 5 | E-50 | 200 | 4,000 |
| 11 | 10 | E-50 | 200 | 2,000 |

*where the resin is the hydrogel polymer.

TABLE 2B

| Example | Dry Density lb/ft³ | Thickness inch | Modulus | F Stress psi | F Strain % |
|---|---|---|---|---|---|
| 8 | 129.2 | .1256 | 22,902 | 185 | 8.43 |
| 9 | 131.8 | .1238 | 21,753 | 147 | 23 |
| 10 | 123.0 | .1404 | 45,194 | 469 | 1.23 |
| 11 | 123.8 | .1176 | 33,182 | 241 | 4.31 |

The addition of the latex significantly improved the strength of the resulting product as seen by the increased stress values. However, it also substantially increased the modulus value which rendered the product stiffer. This may detract from the viscoelastic damping of the binder.

EXAMPLES 12–17

These examples illustrate the properties of sheets obtained when increasing amounts of the filler calcium carbonate, CaCO₃, are mixed with different amounts of the hydrogel binder.

The same procedure was used as in Examples 1–7 except that the prepolymer of Preparatory Example 2 was used and the prepolymer was preheated to approximately 42° C. to make it easier to measure and pour before using. The ingredients for each example are listed in Table 3A and the properties of the products are in Table 3B.

TABLE 3A

| Example | Polymer g. | CaCO₃ g. | wt. % Polymer | CaCO₃ phr |
|---|---|---|---|---|
| 12 | 5 | 97.7 | 5.1 | 1954 |
| 13 | 5 | 130 | 3.8 | 2600 |
| 14 | 5 | 140 | 3.6 | 2800 |
| 15 | 10 | 97.7 | 10.2 | 977 |
| 16 | 10 | 130.2 | 7.1 | 1302 |
| 17 | 10 | 140 | 7.1 | 1400 |

TABLE 3B

| Example | Dry Density lb/ft³ | % Shrinkage on Drying | Modulus | F Stress psi | F Strain % |
|---|---|---|---|---|---|
| 12 | 140 | 19.57 | 4,210 | 66 | 61 |
| 13 | 103 | 12.42 | 2,916 | 49 | 82 |
| 14 | 92.2 | 11.39 | 4,247 | 50 | 93 |
| 15 | 141 | 22.28 | 5,452 | 78 | 179 |
| 16 | 95 | 10.26 | 4,701 | 70 | 286 |
| 17 | 106 | 11.07 | 3,575 | 61 | 239 |

These are also rubbery to leathery in feel and thus are good sound damping materials. Since the densities are less than BaSO₄, the sheets would have to be thicker to obtain the same mass per unit area.

EXAMPLE 18

This example illustrates the properties of a sheet obtained when a surfactant is added to a mixture of calcium carbonate and the hydrogel binder.

The same procedure as in Example 15 was followed except that the initial aqueous slurry also had added 0.5 g. of the surfactant Pluronic P-75 made by BASF Wyandotte. The properties are set forth in Table 4.

TABLE 4

| Example | Dry Density lb/ft³ | % Shrinkage on Drying | Modulus | F Stress psi | F Strain % |
|---|---|---|---|---|---|
| 18 | 116 | 18.09 | 2,544 | 62 | 345 |

This shows the significant decrease in modulus caused by the surfactant which results in a much more flexible sheet.

EXAMPLE 19

This example illustrates the use of a non-woven backing to provide additional strength to the sound deadening composition.

An aqueous mixture of 50 g. water and 150 g. BaSO₄ was first mixed together. Then 5 g. of the prepolymer made in preparatory Example 2 was added with further mixing for 10 seconds. The mixture was cast on to a layer of unbonded nontreated Kodel Polyester fibers. The layer of fibers was on a sheet of polyethylene and then after coating a second sheet was placed on top and the sandwiched layer was rolled out with an 18 pound rolling pin.

The resulting product had the following properties as set forth in Table 5.

TABLE 5

| Example | Thickness Inch | Modulus | F Stress psi | F Strain % |
|---|---|---|---|---|
| 19 | .047 | 5,621 | 292 | 25 |

This shows the very significant increase in tensile strength when compared to Example 1 by using the non-woven backing.

What is claimed:

1. A sound deadening material comprising
   (a) an elastomeric cross-linked polyurethane binder and
   (b) substantial amounts of sound deadening particles incorporated therein,
   werein the weight ratio of b to a is at least 10 which is made by reacting together an aqueous slurry of sound deadening particles and a water-miscible prepolymer which reacts with the water to form elastomeric cross-linked polyurethane binder.

2. The material according to claim 1, wherein the binder comprises a polyurethane hydrogel.

3. The material according to claim 1, wherein the sound deadening particles are selected from the group consisting of barium sulfate, calcium carbonate, metal powders, and mixtures thereof.

4. The material according to claim 1, wherein the binder is formed by the reaction product of a water-miscible prepolymer of a polyether glycol capped with polyisocyanates having a number average molecular weight of about at least 2,000 and water.

5. The material according to claim 4, wherein the polyether polyol is made of random ethylene oxide units and other alkylene oxide units and wherein the ratio of ethylene oxide units to the total number of ethylene oxide and alkylene oxide units is sufficient to make the prepolymer water-miscible.

6. The material according to claim 5, wherein the polyether polyol is made of random ethylene oxide units and propylene oxide units.

7. The material according to claim 4, wherein said prepolymer is present in the reaction mixture in an amount of about 1 to 20 parts by weight per 100 parts of water.

8. The material according to claim 1, wherein the weight ratio of b to a is at least 20.

9. The material according to claim 1, further comprising a latex.

10. The material according to claim 9, wherein the latex is present in an amount up to about 20 times the weight of the binder.

11. A flexible barrier material capable of reducing sound transmission comprising a sheet structure of woven or nonwoven fibers to which has been applied the sound deadening mateial of claim 1.

12. The flexible barrier material according to claim 11, further comprising a latex present in an amount of up to about 20 times the weight of the binder.

13. A method of producing a sound deadening, elastomer cross-linked polyurethane composition by reacting together:
(a) a water-miscible prepolymer of a polyether polyol capped with polyisocyanates having a number average molecular weight of about at least 2,000 and
(b) an aqueous slurry containing sound deadening particles, said prepolymer being present in the reaction in an amount of 1–100 parts by weight per 100 parts of water.

14. The method according to claim 13, wherein the weight reatio of the sound deadening particles to the prepolymer is at least 10.

15. The method according to claim 14, wherein the ratio is at least 20.

16. The method according to claim 14, wherein the sound deadening particles are selected from the group consisting of barium sulfate, calcium carbonate, metal powders, and mixtures thereof.

17. A sound deadening composition made by the method of claim 13.

18. A sound deadening composition made by the method of claim 16.

* * * * *

UNITED STATES PATENT AND TRADEMARK OFFICE
CERTIFICATE OF CORRECTION

PATENT NO. : 4,367,259
DATED : January 4, 1983
INVENTOR(S) : Glenn E. Fulmer et al It is certified that error appears in the above-identified patent and that said Letters Patent are hereby corrected as shown below:

Column 12, line 47, delete the word "werein" and insert therefor --wherein--.

Column 12, line 60, delete the word "glycol" and insert therefor --polyol--.

Signed and Sealed this

Twenty-second Day of March 1983

[SEAL]

Attest:

GERALD J. MOSSINGHOFF

Attesting Officer    Commissioner of Patents and Trademarks